US012370814B2

(12) United States Patent
Taguchi

(10) Patent No.: US 12,370,814 B2
(45) Date of Patent: Jul. 29, 2025

(54) PRINTING APPARATUS

(71) Applicant: CANON KABUSHIKI KAISHA, Tokyo (JP)

(72) Inventor: Motoyuki Taguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 17/547,328

(22) Filed: Dec. 10, 2021

(65) Prior Publication Data

US 2022/0203713 A1 Jun. 30, 2022

(30) Foreign Application Priority Data

Dec. 24, 2020 (JP) ................................. 2020-215558

(51) Int. Cl.

*B65H 7/02* (2006.01)
*B41J 11/00* (2006.01)
*B41J 13/10* (2006.01)
*B65H 7/04* (2006.01)
*B65H 7/14* (2006.01)

(52) U.S. Cl.

CPC ......... *B41J 11/0095* (2013.01); *B41J 13/103* (2013.01); *B65H 7/02* (2013.01); *B65H 2553/61* (2013.01); *B65H 2553/81* (2013.01)

(58) Field of Classification Search

CPC .. B65H 2553/61; B65H 2553/81; B65H 7/04; B65H 7/02; B65H 7/14; B41J 11/0095; B41J 13/103

See application file for complete search history.

(56) References Cited

U.S. PATENT DOCUMENTS

| | | | | |
|---|---|---|---|---|
| 5,743,522 A * | 4/1998 | Rubscha | .................. | B65H 1/04 271/145 |
| 5,882,130 A * | 3/1999 | Kumazaki | ................ | B65H 7/02 271/265.01 |
| 6,651,977 B2 * | 11/2003 | Tanaka | ..................... | B65H 7/04 271/154 |
| 7,823,874 B2 | 11/2010 | Fuchi | | |
| 9,592,977 B2 | 3/2017 | Ota et al. | | |

(Continued)

FOREIGN PATENT DOCUMENTS

| | | |
|---|---|---|
| JP | 05246608 A * | 9/1993 |
| JP | 2008303002 A * | 12/2008 |

(Continued)

OTHER PUBLICATIONS

U.S. Appl. No. 17/584,947, Hisashi Taniguchi, Jan. 26, 2022.
Office Action dated Sep. 3, 2024, in Japanese Patent Application No. 2020-215558.

*Primary Examiner* — Luis A Gonzalez
(74) *Attorney, Agent, or Firm* — Venable LLP

(57) ABSTRACT

A printing apparatus that is unlikely to damage a printing medium with a detection lever includes a feeding unit configured to receive a printing medium and to convey the printing medium in a conveyance direction; and a detection lever configured to rotate about a rotation axis for detecting a printing medium on the feeding unit, wherein in a width direction of a printing medium, which intersects with the conveyance direction, a first position of a contact between the detection lever and the printing medium and a second position of a center of the rotation axis are different.

14 Claims, 15 Drawing Sheets

(56) References Cited

U.S. PATENT DOCUMENTS

| | | | | |
|---|---|---|---|---|
| 2004/0041329 | A1* | 3/2004 | Hiraoka | B65H 7/04<br>271/110 |
| 2004/0195757 | A1* | 10/2004 | Lyu | B65H 7/02<br>271/110 |
| 2009/0057989 | A1* | 3/2009 | Fuchi | B65H 1/08<br>271/147 |
| 2009/0278905 | A1* | 11/2009 | Onuma | B41J 13/103<br>347/104 |

FOREIGN PATENT DOCUMENTS

| | | | |
|---|---|---|---|
| JP | 2009-057162 | A | 3/2009 |
| JP | 2015-189563 | A | 11/2015 |

* cited by examiner

PRINTING APPARATUS

BACKGROUND OF THE INVENTION

Field of the Invention

The present disclosure relates to a printing apparatus.

Description of the Related Art

Conventionally, in a serial printing apparatus, there is known a unit configured to detect whether or not a printing medium is set to a feeding unit. As the unit such as this, there is an actuator that detects the presence/absence of a printing medium within a feeding unit. Japanese Patent Laid-Open No. 2015-189563 has disclosed a structure in which the direction in which the rotation axis of the actuator (tip of detection lever) lies at right angles to the direction in which a printing medium is inserted into the feeding unit (referred to as insertion direction) by a user and the actuator rotates only in the insertion direction with respect to the initial position.

SUMMARY OF THE INVENTION

However, with the structure of Japanese Patent Laid-Open No. 2015-189563, there is a concern that the printing medium might be damaged as a result of the actuator trying to rotate to the side on which the actuator digs into the printing medium at the time of pulling out the printing medium in the return direction opposite to the insertion direction in jam processing or the like.

Consequently, an object of one embodiment of the present invention is to provide a printing apparatus that is unlikely to damage a printing medium with a detection lever.

One embodiment of the present invention is a printing apparatus including: a feeding unit configured to receive a printing medium and to convey the printing medium in a conveyance direction; and a detection lever configured to rotate about a rotation axis for detecting a printing medium on the feeding unit, wherein in a width direction of a printing medium, which intersects with the conveyance direction, a first position of a contact between the detection lever and the printing medium and a second position of a center of the rotation axis are different.

Further features of the present invention will become apparent from the following description of exemplary embodiments with reference to the attached drawings.

BRIEF DESCRIPTION OF THE DRAWINGS

14A and FIG. 14B are each an explanatory diagram of a position relationship between a printing medium and the detection unit.

DESCRIPTION OF THE EMBODIMENTS

First Embodiment

<General Configuration of Printing Apparatus>

Figure 1A:
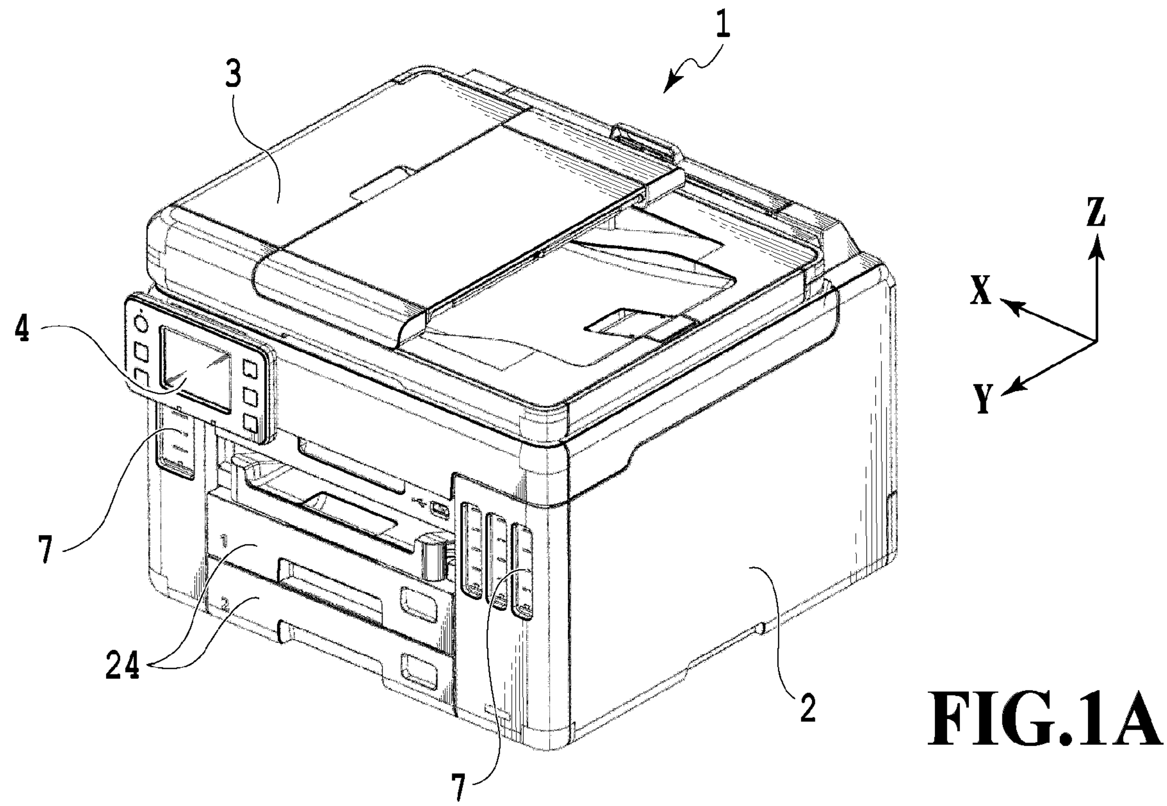
FIG. 1A and FIG. 1B are each a diagram showing an outer appearance of a printing apparatus.

FIG. 1A is a perspective diagram showing an outer appearance of a printing apparatus 1 according to a first embodiment. The printing apparatus 1 has a substantially cuboid shape on the whole and a reading device 3 is provided on the top section of a main body 2 so that the reading device 3 can open and close freely and on the front face of the main body 2, a touch-panel display device 4 that receives the operation of a user is provided.

Figure 1B:
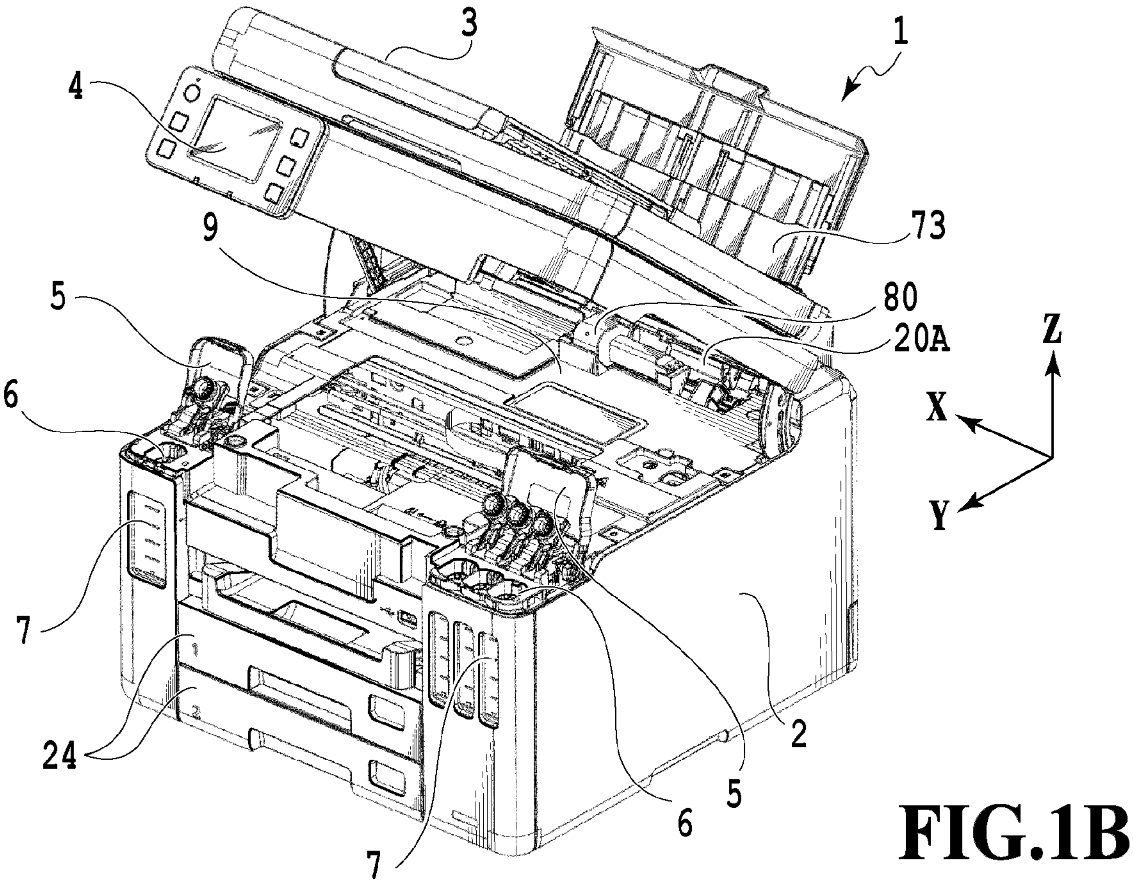

FIG. 1B is a perspective diagram showing a state (called open state) where each of the reading device 3 and an ink tank cover 5 rotates and opens. On the front face of the printing apparatus 1, an ink filling port 6 for ink filling is provided. To explain coordinate axes in each of FIG. 1A and FIG. 1B, an arrow X indicates the width direction of the printing apparatus 1, an arrow Y indicates the depth direction of the printing apparatus 1, and an arrow Z indicates the vertical direction (height direction of the printing apparatus 1) and these directions are perpendicular to one another. For the sake of explanation, in the other drawings as well to be explained later, the same coordinate axes as those in FIG. 1A and FIG. 1B are set as needed.

The printing apparatus 1 is a serial ink jet printing apparatus that prints an image by ejecting ink supplied from an ink tank 7 onto a printing medium, but it is also possible to apply the present embodiment to another type of serial printing apparatus. "Printing" includes, in a broad sense, not only a case where significant information, such as a character and a figure, is formed but also a case where an image, a pattern or the like is formed on a printing medium whether or not they are significant, or a medium is modified, and printing is irrespective of whether or not it creates something so that it can be perceived by the human visual sense. Further, in the present embodiment, as the "printing medium", paper in the form of a sheet is supposed, but the "printing medium" may be cloth, plastic, film, or the like.

Figure 2A:
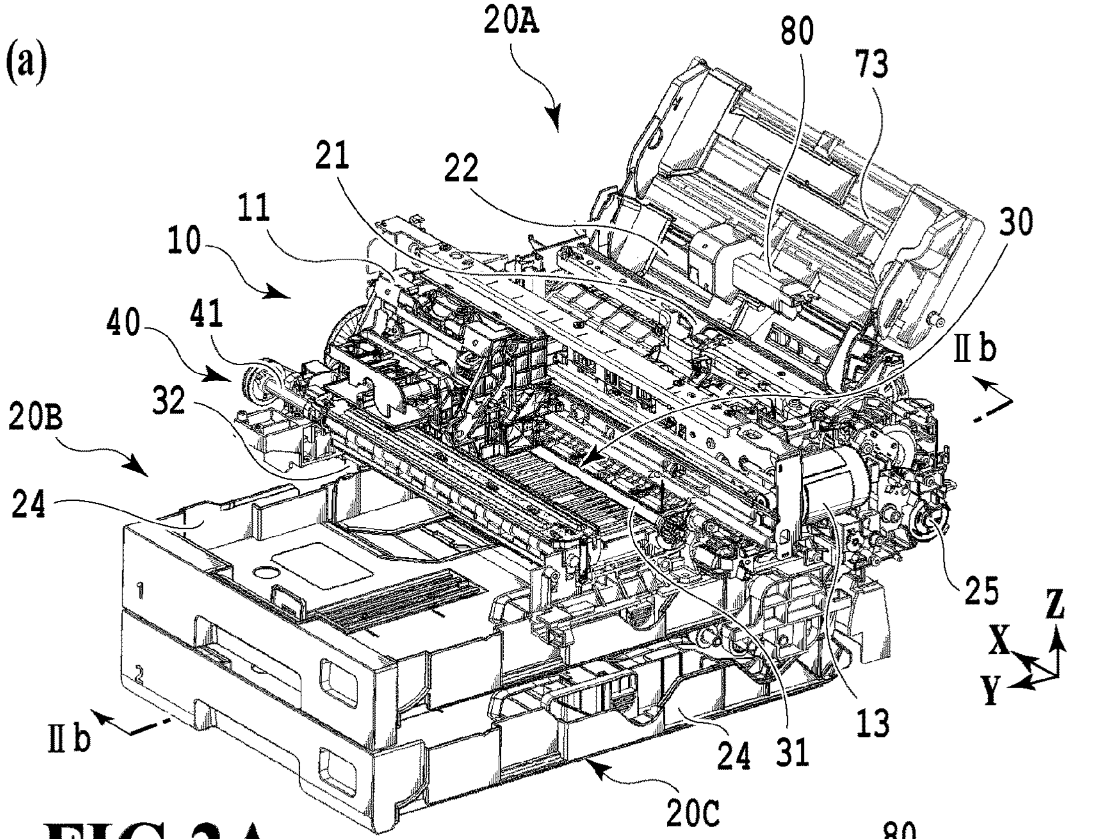
FIG. 2A and FIG. 2B are each a diagram showing an internal mechanism of the printing apparatus.
Figure 2B:
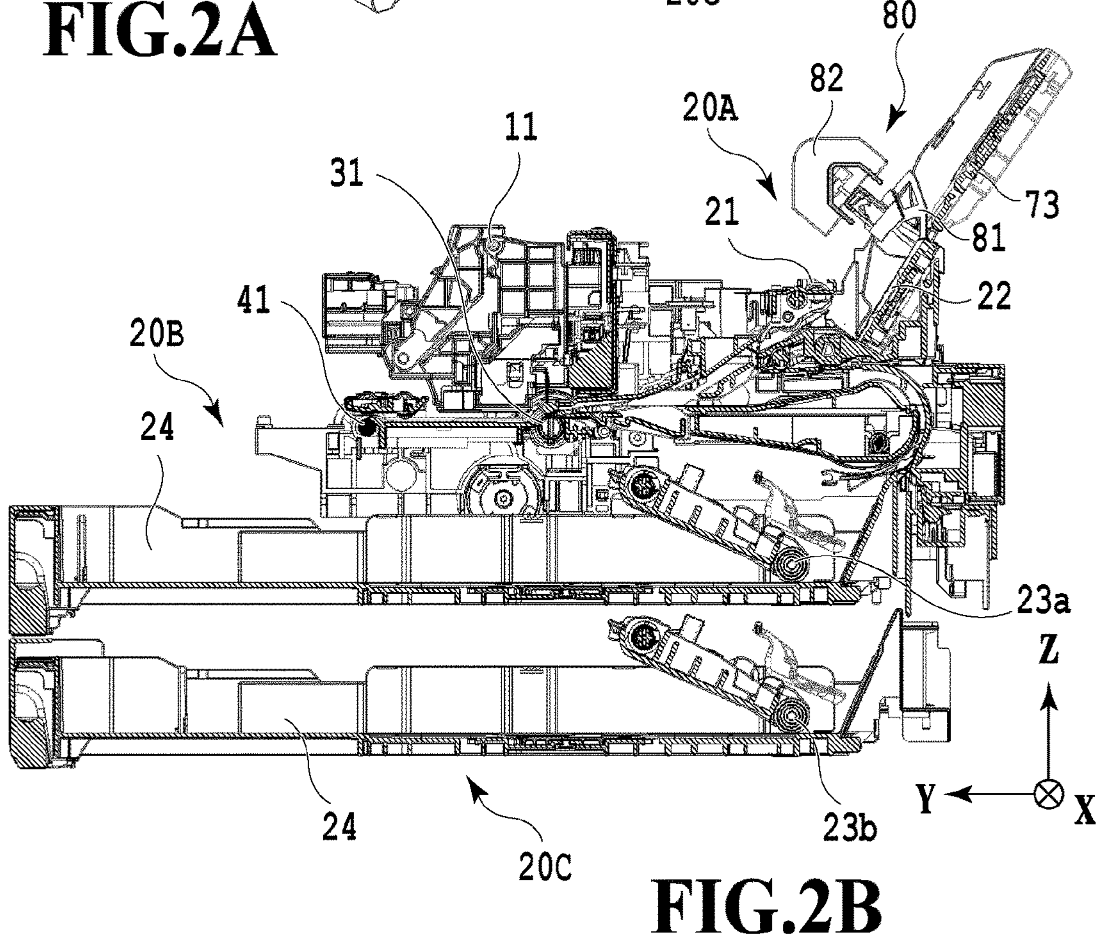

FIG. 2A is a perspective diagram showing the internal mechanism of the printing apparatus 1 and FIG. 2B is a cross-sectional diagram showing the internal mechanism of the printing apparatus 1. The printing apparatus 1 has a printing unit 10, feeding units 20A to 20C, a conveyance unit 30, and a discharging unit 40.

The feeding unit 20A, the feeding unit 20B, the feeding unit 20C, the conveyance unit 30, and the discharging unit 40 are each a mechanism of conveying a printing medium. There is a case where the conveyance direction of a printing medium is called "sub scanning direction" and the source side of conveyance (loading table side) is called "upstream side" and the destination side of conveyance (discharge tray side of the discharging unit) is called "downstream side". The sub scanning direction of the present embodiment includes the +Y-direction (feed direction) and the −Y-direction (return direction) in a planar view of the printing apparatus 1.

The printing apparatus 1 has three feeding paths and specifically, the feeding unit 20A configures one of the feeding paths, the feeding unit 20B configures another feeding path, and further, the feeding unit 20C configures the other feeding path. The feeding unit 20A has a feeding roller 21 extending in the X-direction. The feeding roller 21 rotates by the driving force that is generated by a driving source 25 (in the present embodiment, motor) and is capable of conveying a printing medium loaded on a loading table 22. The loading table 22 is arranged at the rear section of the main body 2 and can be opened so that the storage state shown in FIG. 1A and the like changes into the open state shown in FIG. 2A and FIG. 2B.

Each of the feeding units 20B and 20C has a feeding cassette 24 that is attached detachably to the bottom section of the printing apparatus 1 from the front section and feeds a printing medium stored in the feeding unit 24 to the conveyance unit 30 by skirting the rear section side of the printing apparatus 1.

The conveyance unit 30 is arranged on the downstream side of each of the feeding unit 20A, the feeding unit 20B, and the feeding unit 20C. The conveyance unit 30 has a conveyance roller 31 extending in the X-direction. The conveyance roller 31 rotates by the driving force of a driving source 32 (in the present embodiment, motor) and conveys a printing medium fed from the feeding unit 20A, the feeding unit 20B, or the feeding unit 20C along a conveyance direction axis (Y-direction axis). A follower roller is caused to come into pressure contact with the conveyance roller 31 and a printing medium is conveyed while being sandwiched by a nip section of the conveyance roller 31 and the follower roller.

The discharging unit 40 is arranged on the downstream side of the conveyance unit 30. The discharging unit 40 has a discharging roller 41 extending in the X-direction. The discharging roller 41 rotates by the driving force of the driving source 32 and discharges a printing medium that is conveyed from the conveyance unit 30.

Figure 3:
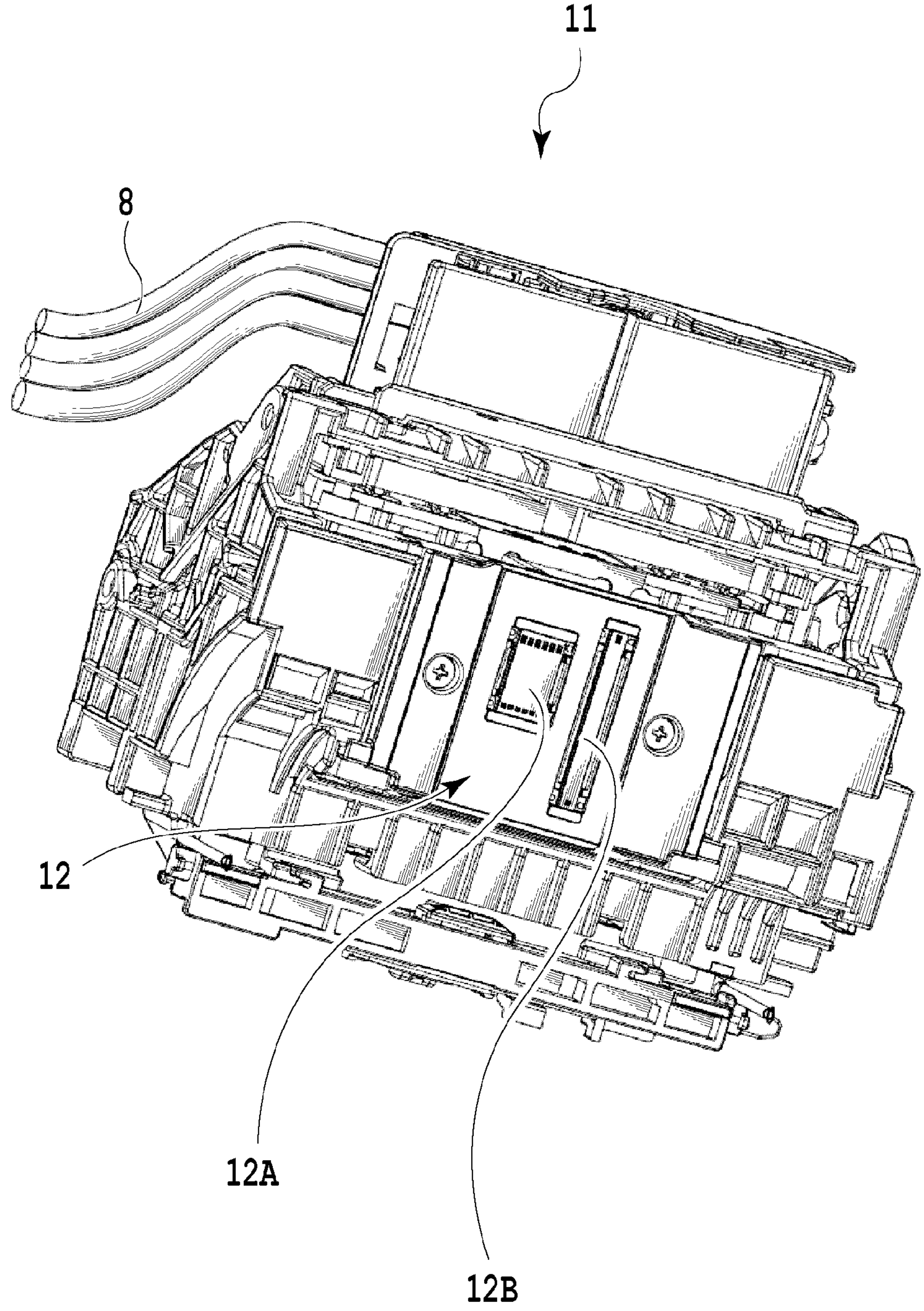
FIG. 3 is a perspective diagram in a case where a carriage is viewed from a bottom face side.

The printing unit 10 is a mechanism that prints an image on a printing medium. The printing unit 10 has a carriage 11. As shown in FIG. 3, on the carriage 11, a plurality of kinds of ink supply tubes 8 is mounted. On the carriage 11, a print head 12 is mounted. The print head 12 may be fixed to the carriage 11 or may be attached thereto detachably.

The print head 12 is provided at the bottom section of the carriage 11. The print head 12 has a plurality of ejection ports ejecting ink and prints an image by ejecting ink supplied from the ink supply tube 8 onto a printing medium conveyed by the conveyance unit 30. In a case of the present embodiment, the print head 12 includes a print head 12A and a print head 12B arranged in the X-direction and the print head 12A and the print head 12B eject different kinds of ink, respectively. For example, the print head 12A ejects black ink of pigment and the print head 12B ejects ink of each color of dye or pigment. There is a case where the surface on which the ejection port of ink is formed is called "ink ejection surface" and in a case of the present embodiment, each undersurface of the print head 12A and the print head 12B is the ink ejection surface.

The printing unit 10 shown in FIG. 2 has a driving mechanism that causes the carriage 11 to reciprocate in a predetermined direction. The reciprocation direction of the carriage 11 is called the main scanning direction and in a case of the present embodiment, the reciprocation direction is the X-axis direction. There is a case where the movement of the carriage 11 is called a (main) scan and printing an image by the print head 12 while moving the carriage 11 is called a printing scan.

The driving mechanism of the carriage 11 includes, for example, a guide rail that guides the movement in the main scanning direction of the carriage 11 and a belt transmission mechanism that moves the carriage 11 in the main scanning direction by transmitting the driving force from a driving source 13 (in the present embodiment, motor) to the carriage 11.

It is possible to perform printing of an image onto a printing medium by the printing apparatus 1 as follows. A printing medium that is fed from the feeding unit 20A, the feeding unit 20B, or the feeding unit 20C is conveyed intermittently by the conveyance unit 30 and the conveyance of the printing medium and the printing of an image onto the printing medium by the printing unit 10 are performed alternately. To explain in detail, the printing medium is conveyed by the conveyance unit 30 in the sub scanning direction and stops so that the row position at which an image is formed on the printing medium is the image printing position (specifically, directly under the ink ejection surface). Then, during the interruption of the conveyance of the printing medium, the printing scan is performed by moving the carriage 11. Following this, the printing medium is conveyed by the conveyance unit 30 and stops so that the row position at which an image is formed next on the printing medium is the image printing position. Then, during the interruption of the conveyance of the printing medium, the printing scan is performed by moving the carriage 11. After this, the same procedure is repeated. In this manner, it is possible to perform printing of an image on the entire printing medium. In a case where the printing of an image is completed, the printing medium is discharged by the discharging unit 40.

<Transmission of Driving Force to Feeding Unit>

Figure 4:
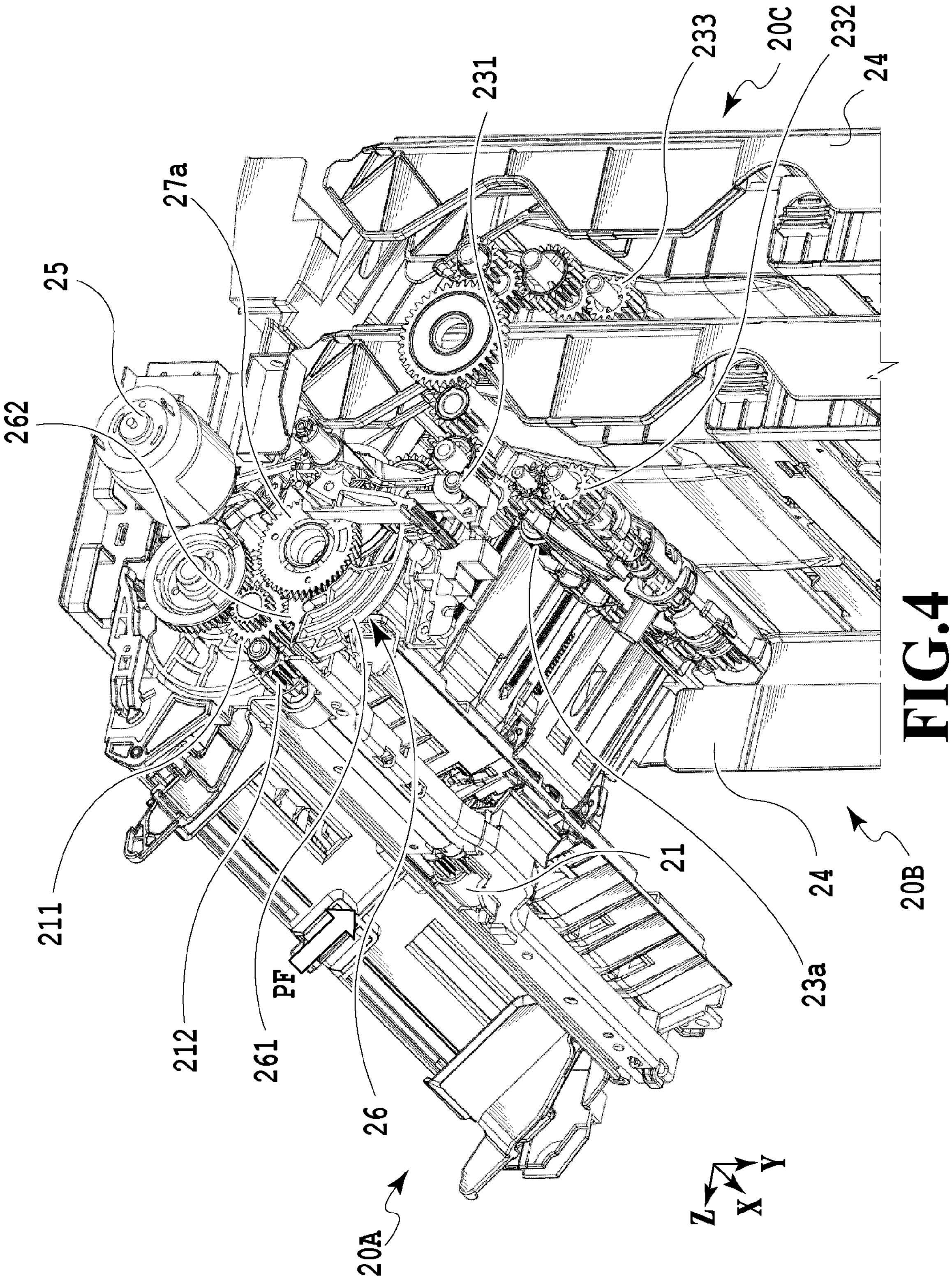
FIG. 4 is an explanatory diagram of transmission of a driving force to a feeding unit.
Figure 5:
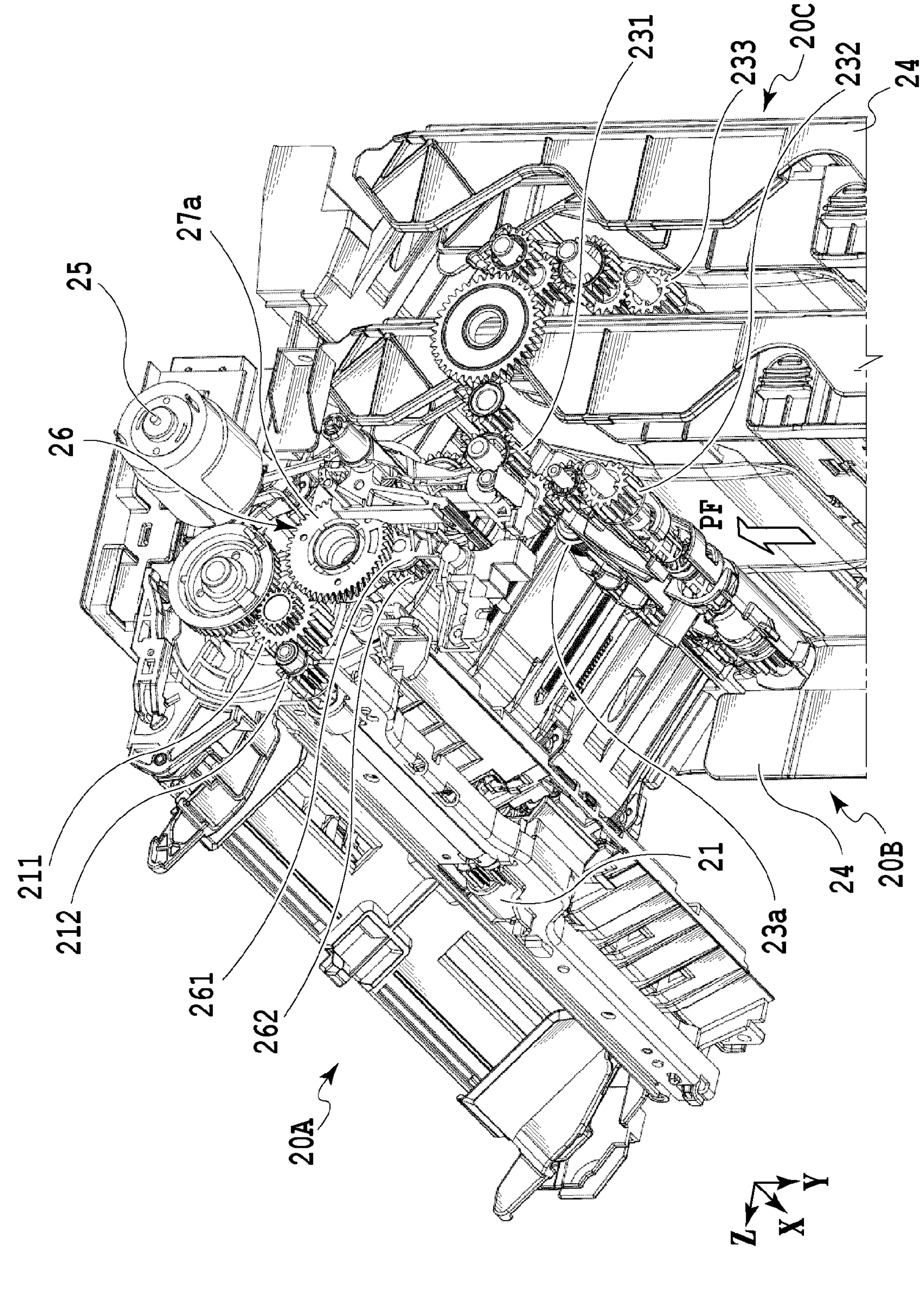
FIG. 5 is an explanatory diagram of transmission of a driving force to the feeding unit.

Transmission of the driving force generated in the driving source 25 to one of the feeding units 20A to 20C is explained. FIG. 4 shows a state where the driving force is transmitted to the feeding unit 20A and FIG. 5 shows a state where the driving force is transmitted to the feeding unit 20B or the feeding unit 20C.

To the feeding units 20A to 20C, the driving force is transmitted selectively by a transmission unit 26. The transmission unit 26 is a mechanism capable of changing its position to an upper transmission position, a lower transmission position, and a non-transmission position. The upper transmission position is a position at which the driving force generated in the driving source 25 is transmitted to the feeding unit 20A (position of the transmission unit 26 shown in FIG. 4). The lower transmission position is a transmission position at which the driving force generated in the driving source 25 is transmitted to the feeding unit 20B or the feeding unit 20C (position of the transmission unit 26 shown in FIG. 5). The non-transmission position is a position of the transmission unit 26 at which the driving force generated in the driving source 25 is not transmitted to any of the feeding units 20A to 20C.

The transmission unit 26 is a pendulum mechanism having a pendulum 261 swingable around the same axis as that of a sun gear 27*a* and a planetary gear 262 rotatably supported by the pendulum 261. Within the swinging range of the transmission unit 26, the upper transmission position and the lower transmission position are included and between the upper transmission position and the lower transmission position, the non-transmission position exists.

The feeding unit 20A has a gear train including a gear 211 and a gear 212 and the feeding roller 21 rotates by the driving force transmitted via this gear train. In a case where the transmission unit 26 is located at the upper transmission position shown in FIG. 4, the planetary gear 262 engages with the gear included in the gear train of the feeding unit 20A and the driving force generated in the driving source 25 is transmitted to the feeding roller 21. Due to this, the printing medium is fed in an arrow PF direction in FIG. 4.

The feeding unit 20B has a gear train including a gear 231 and a gear 232 and a feeding roller 23*a* rotates by the driving force transmitted via this gear train. Further, the feeding unit 20C has a gear train including the gear 231 and a gear 233 and a feeding roller 23*b* shown in FIG. 2B (not shown schematically in FIG. 5) rotates by the driving force transmitted via this gear train. In a case where the transmission unit 26 is located at the lower transmission position shown in FIG. 5, the planetary gear 262 engages with the gear included in the gear train of the feeding unit 20B or the feeding unit 20C and the driving force generated in the driving source 25 is transmitted to the feeding roller 23*a* or the feeding roller 23*b*. Due to this, the printing medium is fed in the arrow PF direction in FIG. 5.

<Detection Unit>

Figure 6A:
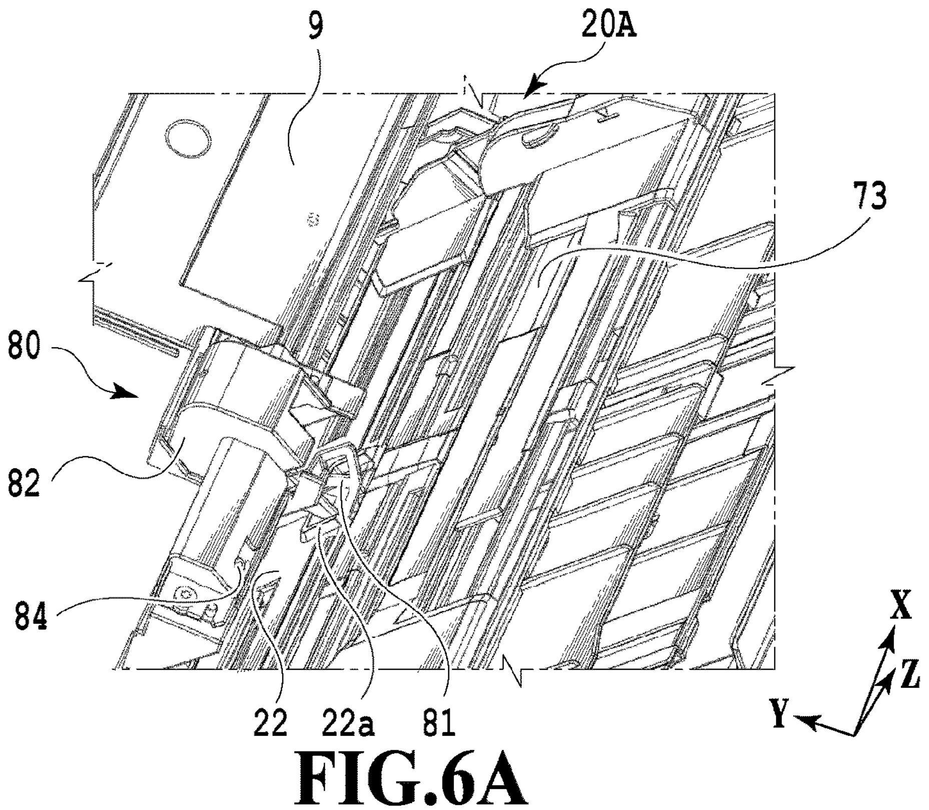
FIG. 6A and FIG. 6B are each an explanatory diagram of a detection unit.
Figure 6B:
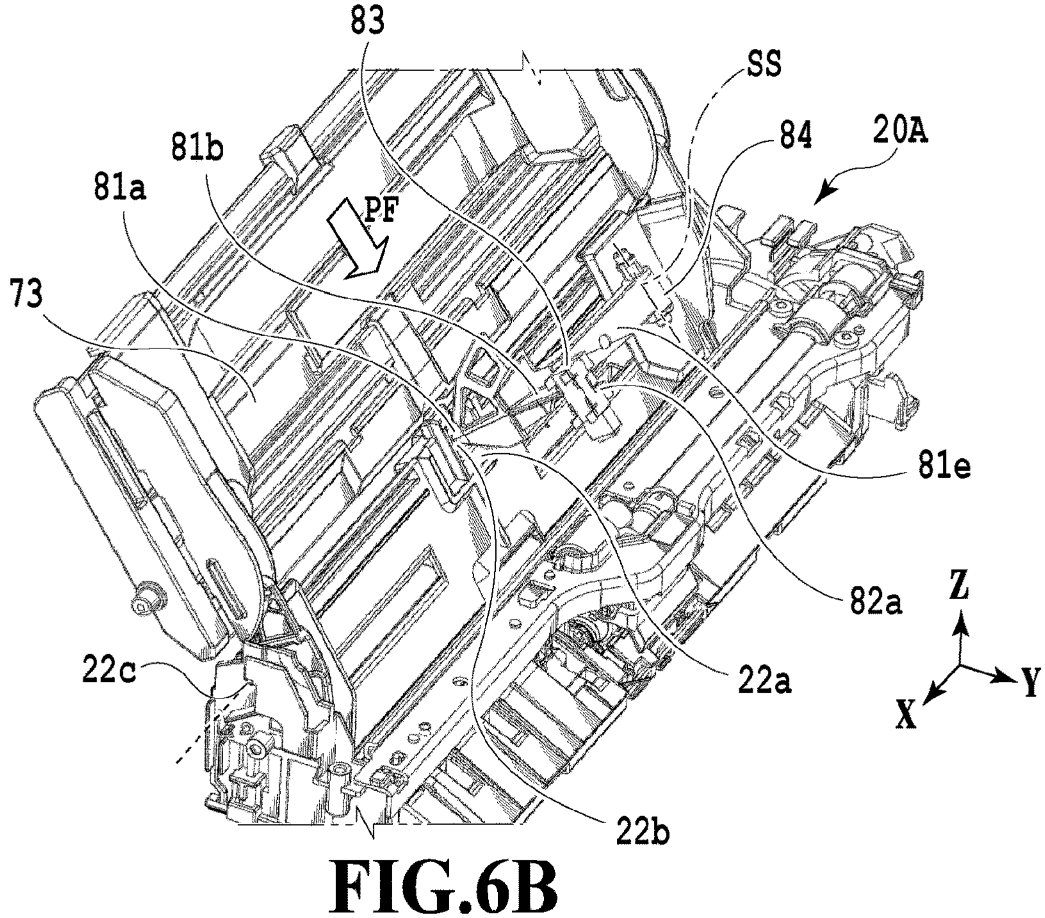

In the following, a detection unit 80 configured to detect whether a printing medium is set to the feeding unit 20A is explained using FIG. 6A and FIG. 6B. FIG. 6A and FIG. 6B are each a perspective diagram of the feeding unit 20A for explaining the detection unit 80 and FIG. 6B shows a state where a detection cover 82 (see FIG. 6A) is removed for explanation.

As shown in FIG. 6A, the detection unit 80 is arranged on a middle cover 9 that covers the top section of the main body 2 and above the loading table 22 of the feeding unit 20A. As regards the detection unit 80, within the detection cover 82 configuring the detection unit 80, a detection lever 81 and a detection unit 83 (in the present embodiment, photo-interrupter) are stored. Only a tip 81*a* of the detection lever 81 protrudes from the detection cover 82 and in a case where there is no printing medium on the loading table 22, the tip 81*a* is stored in a concave section 22*a* and lands on a concave section bottom face 22*b*. The concave section bottom face 22*b* is located at a position deeper (lower) than the placement surface of a printing medium on the loading table 22. Further, the landing point of the tip 81*a* is substantially on the straight line of a rotation axis center 22*c* of the loading table 22. Due to the structure such as this, even in a case where the loading table 22 rotates at the time of sheet feed, the tip 81*a* hardly moves. FIG. 6B shows a first state (in a case of the present embodiment, light receiving state of photo-interrupter) where a detection lever flag 81*b* protrudes from a detection unit 82*a* of the detection unit 83.

An arm unit 81*e* of the detection lever 81 stored in the detection cover 82 extends in the X-direction (see FIG. 1A), which is the width direction of the product, and a rotation axis 84 of the detection lever 81 is provided on the end section of the arm. The rotation axis 84 is supported pivotally by the detection cover 82 and rotates by the tare weight of the detection lever 81. An axis center direction (direction in which the rotation axis 84 extends) SS of the rotation axis 84 extends in the Y-direction in a state where the reading device 3 and a loading tray 73 are closed (that is, in a planar view of FIG. 1A) and is not perpendicular to the conveyance direction PF of the feeding unit 20A (substantially parallel).

<Detection Lever>

In the following, the detection lever 81 is explained by using FIG. 7A. The detection lever 81 can rotate about the rotation axis 84 and has the tip 81*a* that comes into direct contact with a printing medium, an upstream-side slope surface 81*c*, a downstream-side slope surface 81*d*, and the detection lever flag 81*b* on the top section in the vertical direction (+z-direction) of those. In an interlocking manner with the rotation of the detection lever 81, the first state (light-receiving state) and a second state (light-shielding state) in the detection unit (photo-interrupter not shown schematically in FIG. 7A) are switched.

In the following, the detailed structure of the detection lever 81, specifically, the upstream-side slope surface 81*c* and the downstream-side slope surface 81*d*, which function as a slope surface section for rotating the detection lever 81, are explained by using FIG. 7A and FIG. 7B, with the upstream-side slope surface 81*c* being taken as an example.

Figure 7A:
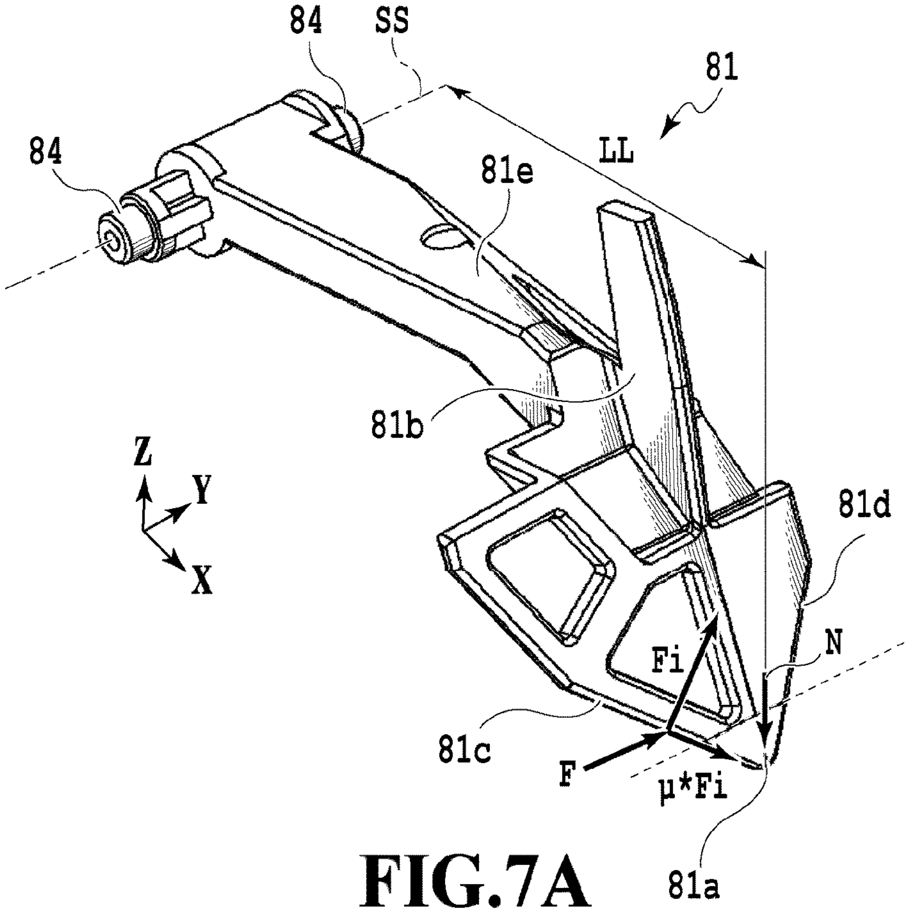
FIG. 7A and FIG. 7B are each an explanatory diagram of the detection unit.
Figure 7B:
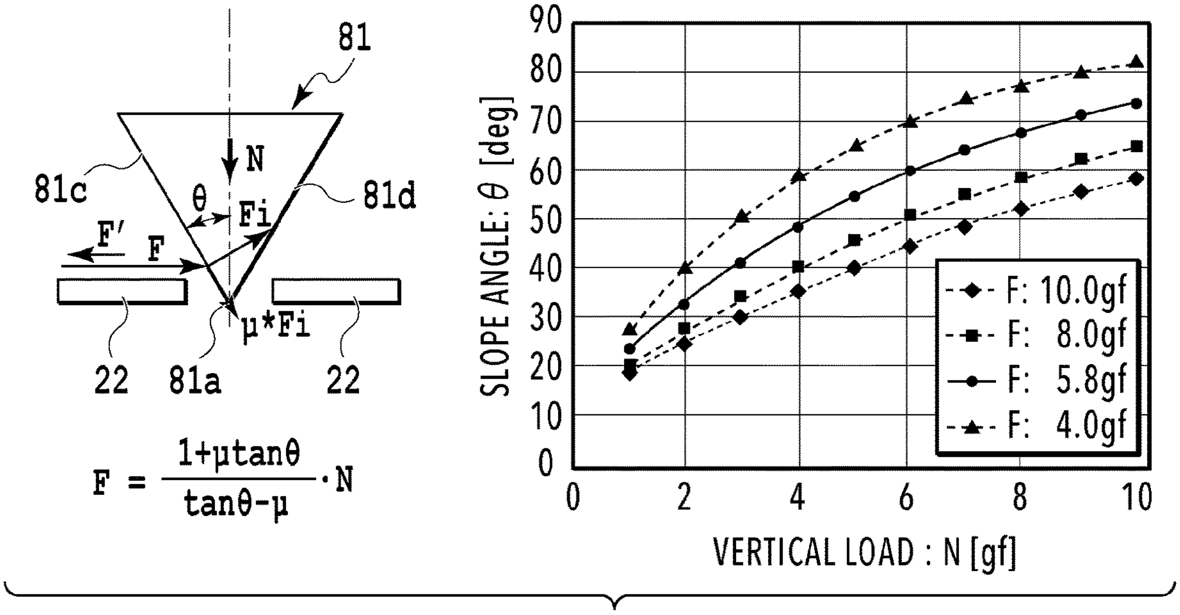

The diagram on the left side in FIG. 7B shows a mechanics model at the time of rotating the detection lever 81 by a printing medium. This diagram shows a vertical load N by the tare weight of the detection lever 81 and a force F that the upstream-side slope surface 81*c* receives by the printing medium at the time of the printing medium lifting up the detection lever 81. Further, this diagram shows a component force Fi of the force F, a frictional force μ*Fi, and an angle θ formed by the vertical direction of the detection lever 81 and the upstream-side slope surface 81*c*.

The graph on the right side in FIG. 7B shows a relationship between the vertical load N [gf] and the slope angle θ [deg] described previously. Based on the vertical load N and the force F that the detection lever 81 receives, the slope angle θ necessary for lifting up the detection lever 81 is found. The force F that the detection lever 81 receives is equal to a conveyance resistance F' that a printing medium receives. Here, in order for a printing medium P to be conveyed without buckling, it is necessary for the detection lever 81 to be lifted up with a load less than or equal to the load by which the printing medium P buckles (in the following, referred to as buckling load). Consequently, it is possible to define F' as the buckling load of the printing medium. For example, in a case where the vertical load N of the detection lever 81 is 4 gf at the time of taking F: 5.8 gf as a target, it can be seen that the slope angle θ needs to be about 48 deg or more. In the present embodiment, the setting value of 0 is 50 deg. In this manner, the slope angle θ is set to an angle with which the detection lever 81 is lifted up with a load less than or equal to the buckling load. The description of the upstream-side slope surface 81*c* also applies to the slope angle in a case where the rear edge of the printing medium that is conveyed from the downstream side to the upstream side comes into contact with the downstream-side slope surface 81*d* and the detection lever 81 is lifted up.

As a unit configured to reduce the vertical load N, it may also be possible to adopt a counter weight or the like, which is provided on the opposite side of the tip 81*a* with the rotation axis 84 in FIG. 7A being taken as a center. Further, in order to obtain the rotation moment by F due to the printing medium P, it is effective to increase a length LL of the arm unit 81*e* shown in FIG. 7A, but the tare weight of the detection lever increases by an amount corresponding to the increased length, and therefore, finally, it is recommended to perform management by using the vertical load N at the tip 81*a*.

<Case where Printing Medium is Set to Feeding Unit>

Figure 8A:
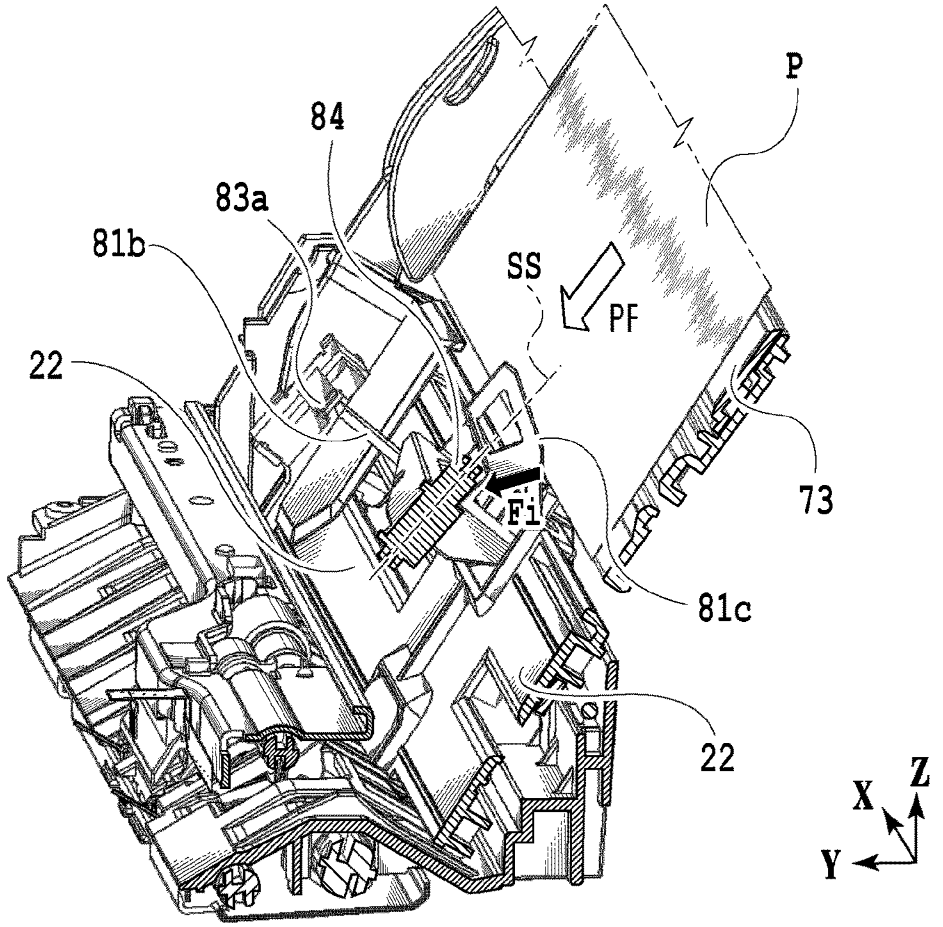
FIG. 8A and FIG. 8B are each an explanatory diagram of setting of a printing medium to the feeding unit.
Figure 8B:
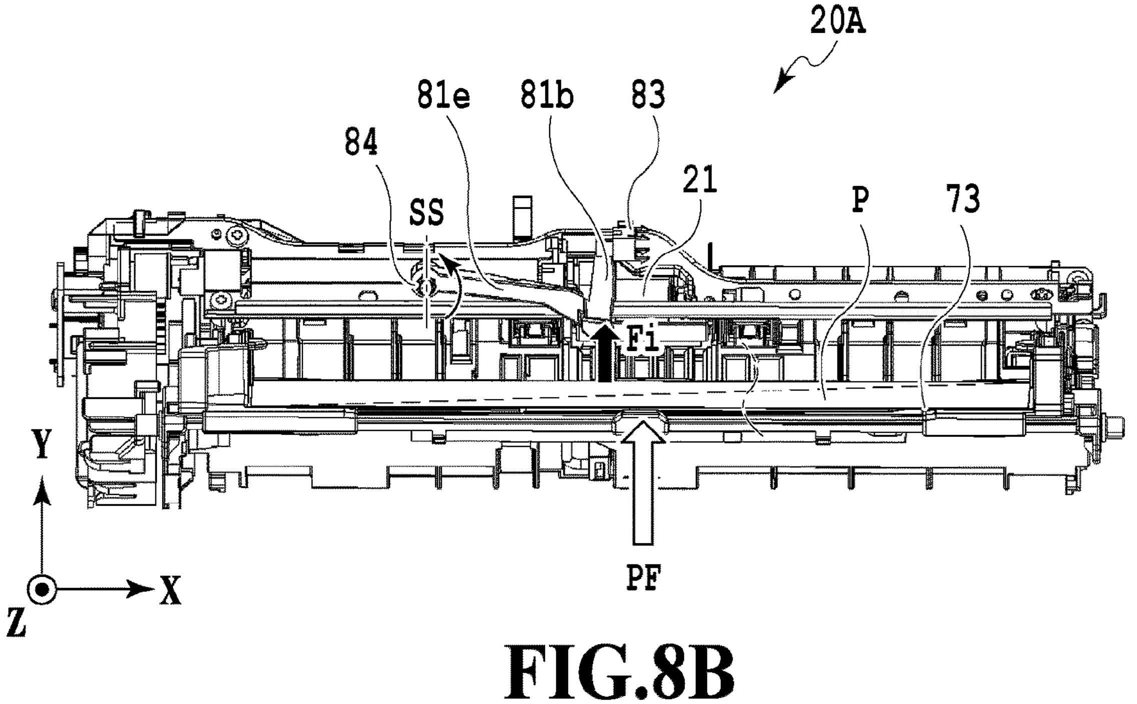
Figure 9:
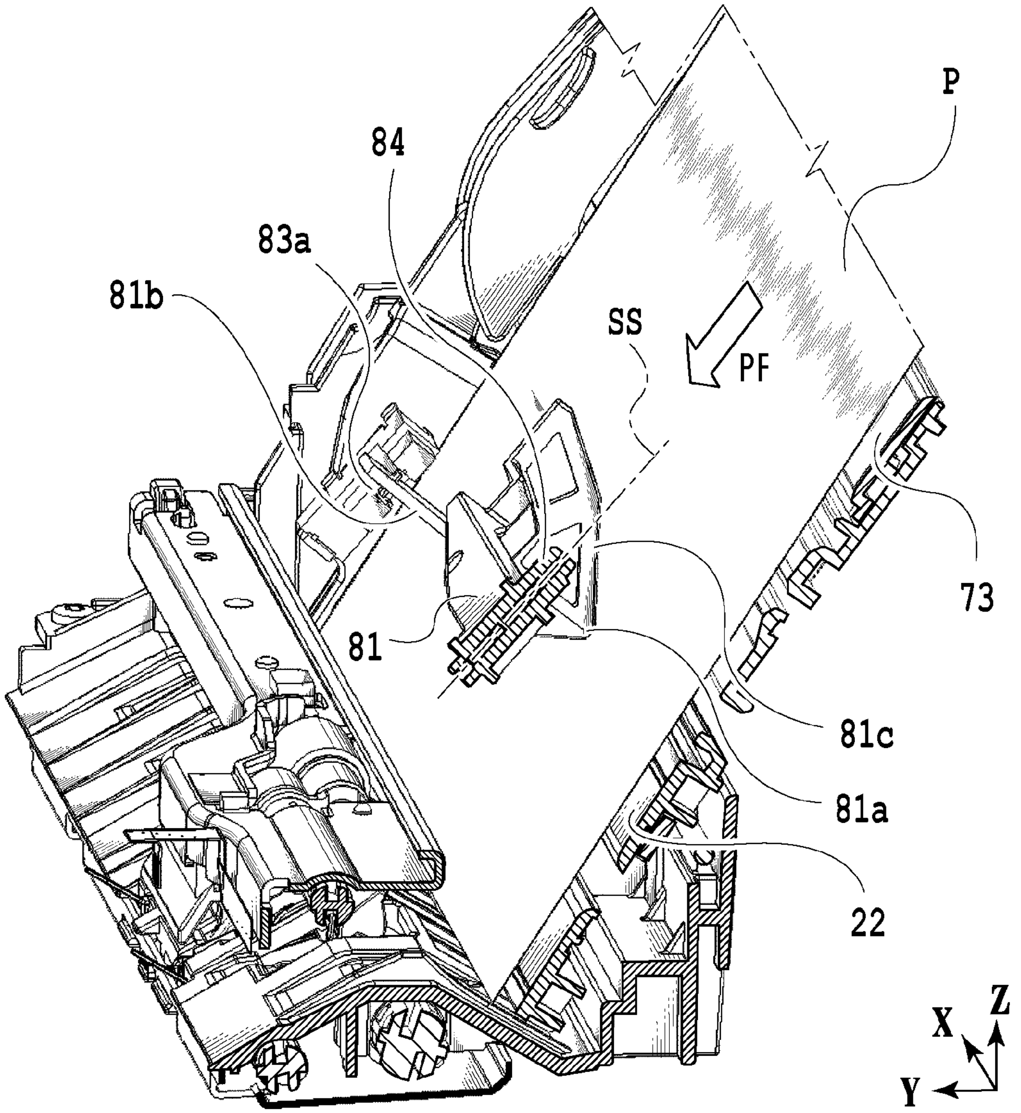
FIG. 9 is an explanatory diagram of setting of a printing medium to the feeding unit.

In the following, how each unit works at the time of setting the printing medium P to the feeding unit 20A and inserting the printing medium P into the printing apparatus 1 is explained by using FIG. 8A, FIG. 8B, and FIG. 9. As shown in FIG. 8A, in a case where the printing medium 9 is inserted in the PF direction in FIG. 8 at the time of setting the one or more printing media P to the loading tray 73 and the loading table 22, which are in the open state, of the feeding unit 20A, the front edge in the conveyance direction of the printing medium P comes into contact with the upstream-side slope surface 81*c* of the detection lever 81. At that time, the position (position in the X-direction of the contact between the detection lever 81 and the printing medium P) in the X-direction (width direction of the printing medium intersecting with the direction in which the printing medium is conveyed) in which the force Fi is applied to the detection lever 81 and the position in the X-direction of the center of the rotation axis 84 are different. Consequently, as shown in FIG. 8B, the moment to the orientation to which the detection lever 81 is lifted up occurs. Due to this, the detection lever 81 rotates upward. As shown in FIG. 9, the tip 81*a* of the detection lever 81 having rotated enters the state where the tip 81*a* lands on the uppermost surface of the printing medium P that is set to the feeding unit 20A. At this time, the detection lever flag 81*b* enters the second state where it has come into the detection unit 83*a* of the detection unit 83 (in the present embodiment, the light-shielding state of the photo-interrupter).

<Case where Printing Medium Having Caused Conveyance Failure is Removed from Feeding Unit Side>

In the following, a case is explained by using FIG. 10A and FIG. 10B where the printing medium P having been fed from the feeding unit 20A and caused a conveyance failure is removed from the side of the feeding unit 20A.

Figure 10A:
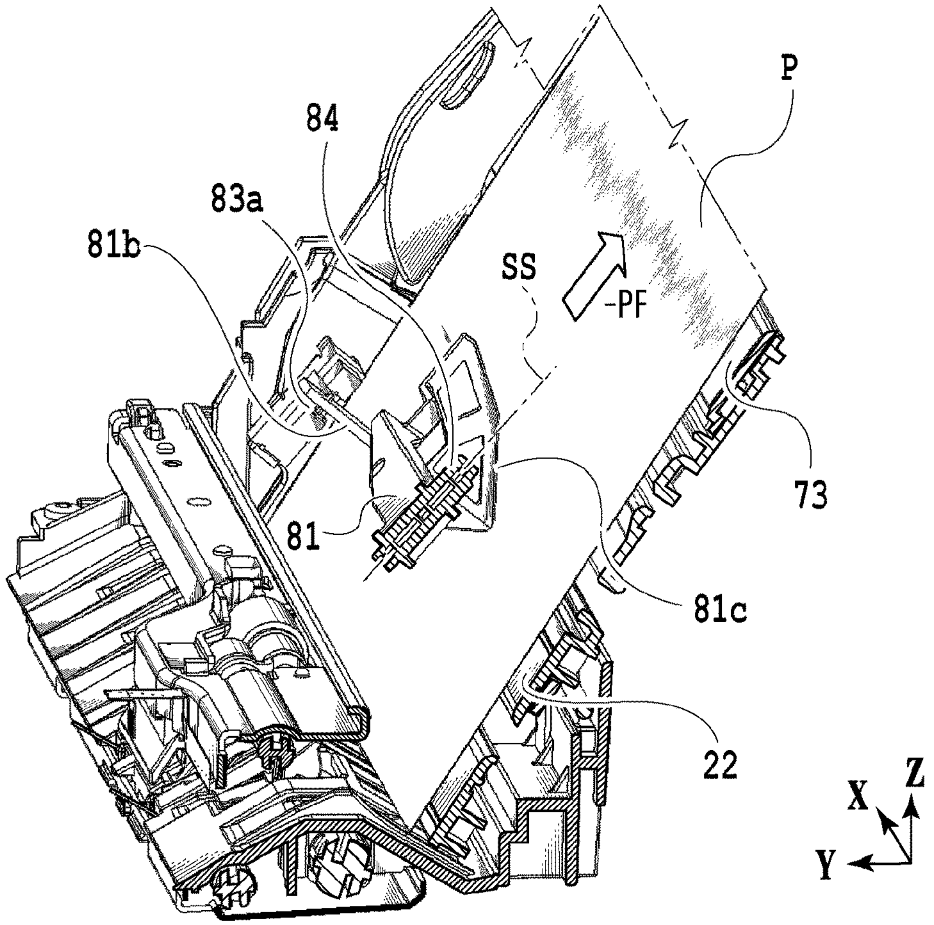
FIG. 10A and FIG. 10B are each an explanatory diagram of a position relationship between a printing medium and the detection unit.
Figure 10B:
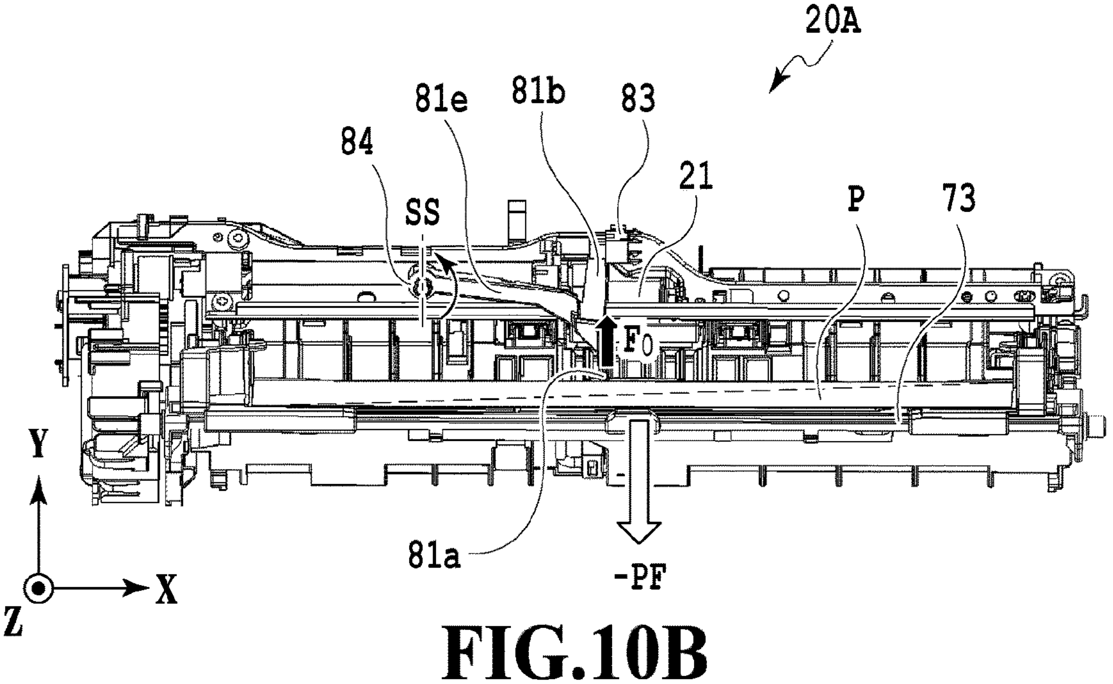

As shown in FIG. 10A, the printing medium P having caused a conveyance failure is removed from the side of the feeding unit 20A, and therefore, the printing medium P is removed from the conveyance path by pulling the printing medium P in the −PF direction (return direction) opposite to the direction in which the printing medium P is set to the feeding unit 20A and inserted into the inside. At that time, the tip 81*a* of the detection lever 81 receives a force $F_0$ in the vertical direction of the uppermost surface of the printing medium P from the printing medium P and the contact, and the contact at which the tip 81*a* receives a force from the printing medium P is shifted from the position in the X-direction of the rotation axis 84, and therefore, no force is applied to the rotation axis 84. That is, as shown in FIG. 10B, the moment to the orientation to which the detection lever 81 is lifted up without the detection lever 81 digging into the printing medium P occurs. Due to this, it is possible for the detection lever 81 to rotate upward for evacuation.

<Case where Printing Medium Enters Detection Lever from Downstream Side>

In the following, a case is explained by using FIG. 11A to FIG. 14B where the printing medium P enters the detection lever 81 from the downstream side.

First, the flow of conveying the printing medium P from the feeding unit 20A up to the conveyance unit is explained by using FIG. 11A to FIG. 12B.

Figure 11A:
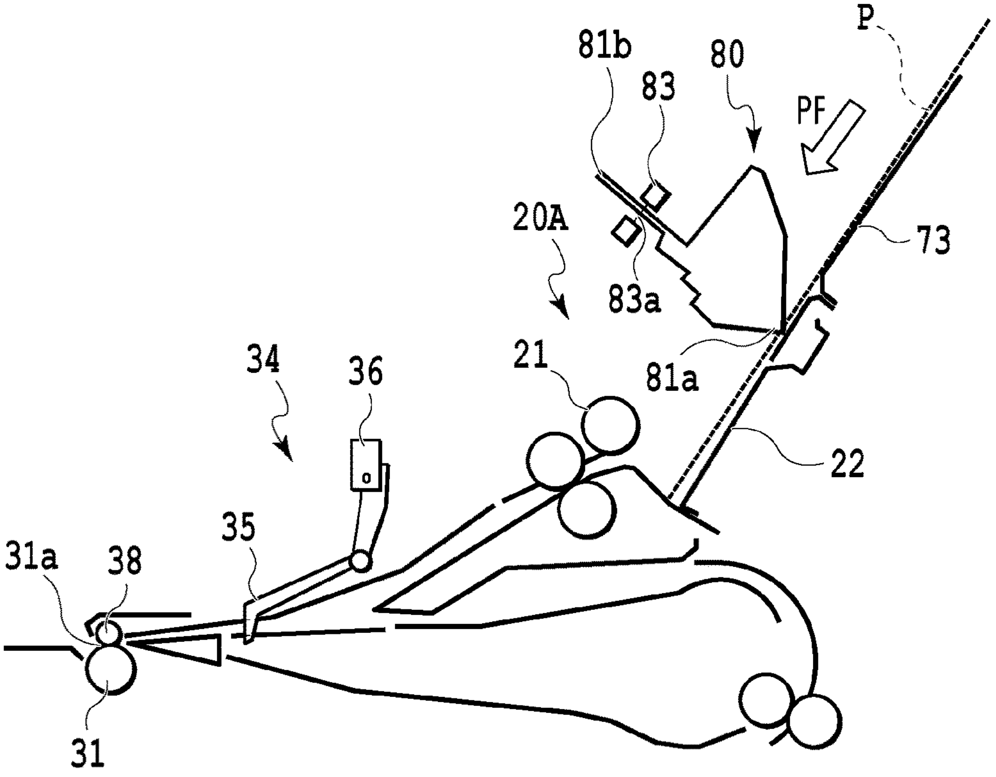
FIG. 11A and FIG. 11B are each an explanatory diagram of a position relationship between a printing medium and the detection unit.

FIG. 11A shows a state where the printing medium P is set to the feeding unit 20A. Before the printing medium P fed from the feeding unit 20A is delivered to the conveyance roller 31, the operation to register the front edge of the printing medium P that is conveyed in an inclined manner is performed by aligning the front edge of the printing medium P with a nip section 31*a* of a pair of the conveyance roller 31 and a follower roller 38. In the following, this operation is called "registration".

Figure 11B:
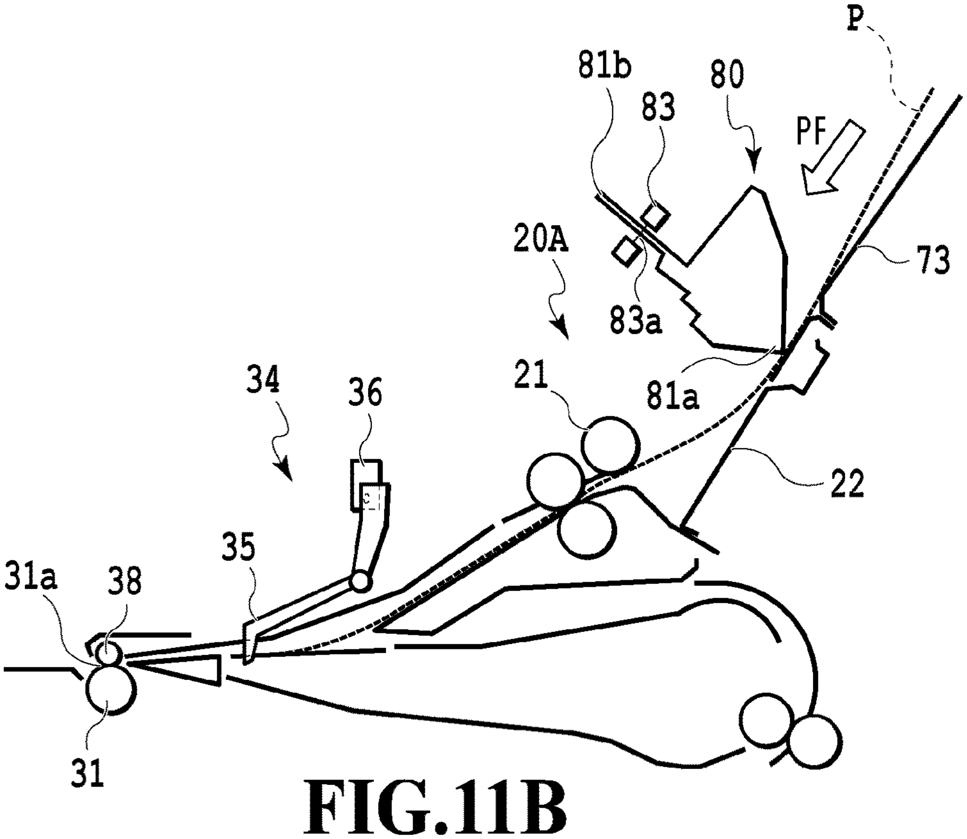

The front edge position of the printing medium P that is fed is managed by a front/rear edge detection unit 34 of the printing medium P, which is provided in the vicinity of the upstream of the conveyance roller 31. The front/rear edge detection unit 34 has a front/rear edge detection lever 35 that rotates by the printing medium P that is fed, and a detection unit 36 (in the present embodiment, photo-interrupter). FIG. 11B shows the way the front edge of the printing medium P that is conveyed in the PF direction enters the front/rear edge detection lever 35.

Figure 12A:
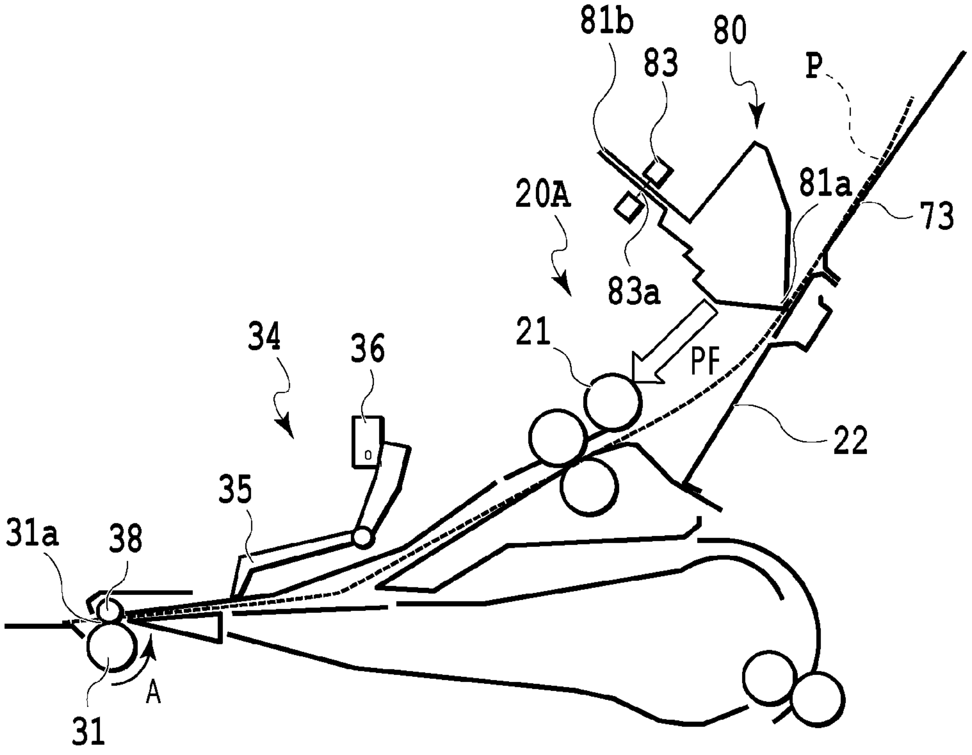
FIG. 12A and FIG. 12B are each an explanatory diagram of a position relationship between a printing medium and the detection unit.

The printing medium P whose front edge position is managed by the front/rear edge detection unit 34 passes the nip section 31*a* of the conveyance roller 31 that rotates to the orientation indicated by an arrow A and stops in the state where the front edge of the printing medium P exceeds the nip section 31*a* by a first predetermined amount. FIG. 12A shows this state. The orientation of the arrow A to which the conveyance roller 31 rotates is the orientation to which the printing medium P is conveyed in the PF direction and in the following, the rotation to the orientation of the arrow A of the conveyance roller 31 is called "forward rotation".

Figure 12B:
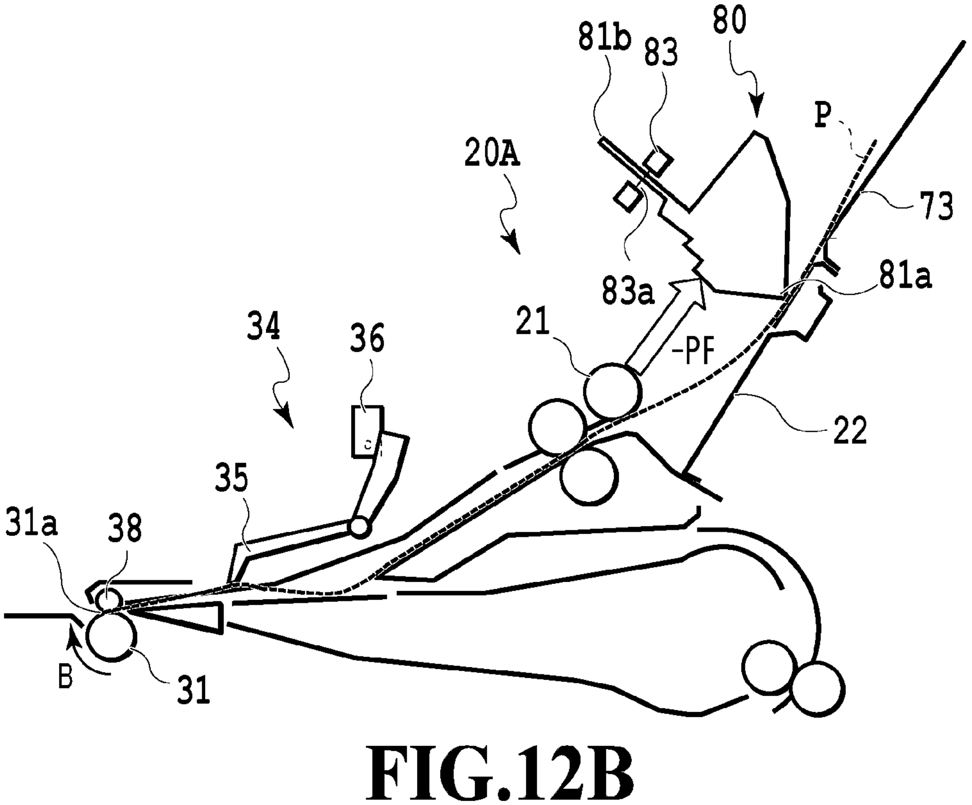

After that, as shown in FIG. 12B, by the conveyance roller 31 rotating to the orientation indicated by an arrow B in the state where the feeding roller 21 of the feeding unit 20A is at rest, the front edge of the printing medium P is returned to the position of the nip section 31*a*. At this time, the feeding roller 21 is at rest, and therefore, as shown schematically, the printing medium P is returned in the state of being bent within the conveyance path. The orientation of the arrow B to which the conveyance roller 31 rotates is the orientation to which the printing medium P is conveyed in the −PF direction and in the following, the rotation to the orientation of the arrow B of the conveyance roller 31 is called "reverse rotation".

Normally, after the processing shown in FIG. 11A to FIG. 12B, printing of an image onto the printing medium is performed by the print head 12 while the conveyance roller 31 is conveying the printing medium and the printing medium P for which the image printing is completed is discharged.

In a control unit 100 (see FIG. 15), to be described later, the driving amount of the driving source 25 from the start of driving of the feeding roller 21 until the detection unit 36 of the front/rear edge detection unit 34 detects the front edge is managed. In a case where the driving amount is extremely small or extremely large, before the registration described previously is performed, the printing medium P is conveyed in the +PF direction from the nip section 31*a* by a second predetermined amount larger than the first predetermined amount. Then, after the conveyance by the second predetermined amount, the operation to match the operation timing of the conveyance roller 31 with that of the feeding roller 21 is performed by the conveyance roller 31 rotating reversely. In the following, this operation is called "registration assist operation".

At the time of the registration assist operation, the printing medium is conveyed by the second predetermined amount larger than the first predetermined amount, and therefore, depending on the size of the printing medium P, there is a case where the rear edge of the printing medium passes the position of the tip 81*a* of the detection lever 81. In a case where the number of printing media P fed from the feeding unit 20A is one, after the rear edge of the printing medium passes through the tip 81*a* of the detection lever 81, the tip 81*a* lands on the concave section bottom face 22*b* deeper (lower) than the placement surface of the loading table 22 as described previously (see FIG. 13A).

Next, a case is explained where the printing medium P having exited once from the detection lever 81 enters the detection lever 81 from the downstream side. To explain in detail, a case is explained by using FIG. 13A to FIG. 14B where the rear edge of the printing medium P enters from the downstream side of the detection lever, whose front edge has entered the detection lever 81 and then whose rear edge has passed the position of the detection lever 81.

Figure 13A:
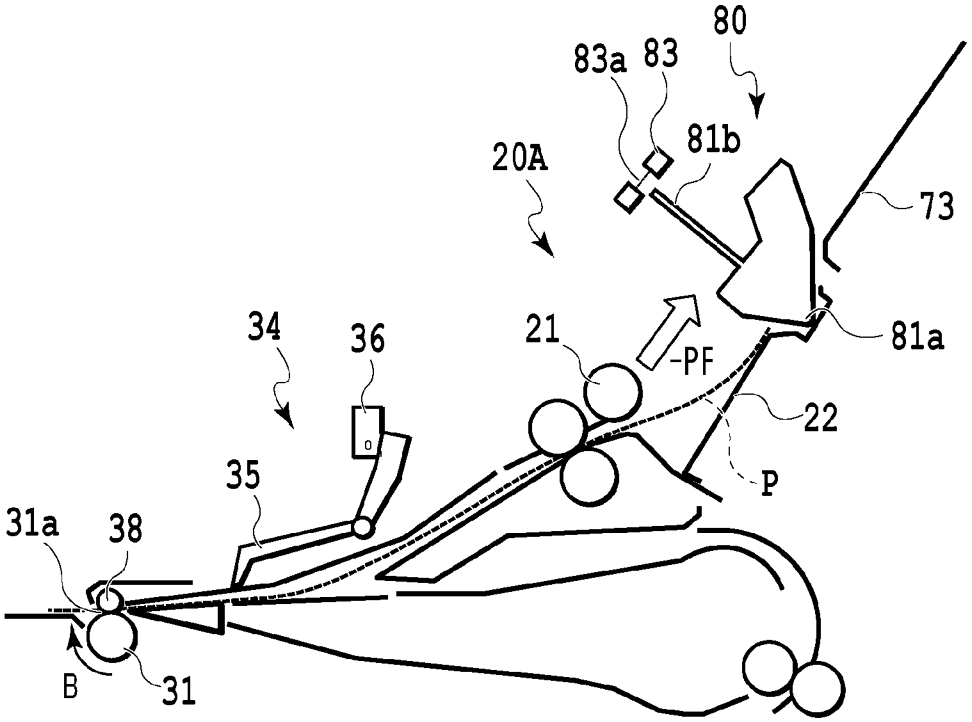
FIG. 13A and FIG. 13B are each an explanatory diagram of a position relationship between a printing medium and the detection unit.
Figure 13B:
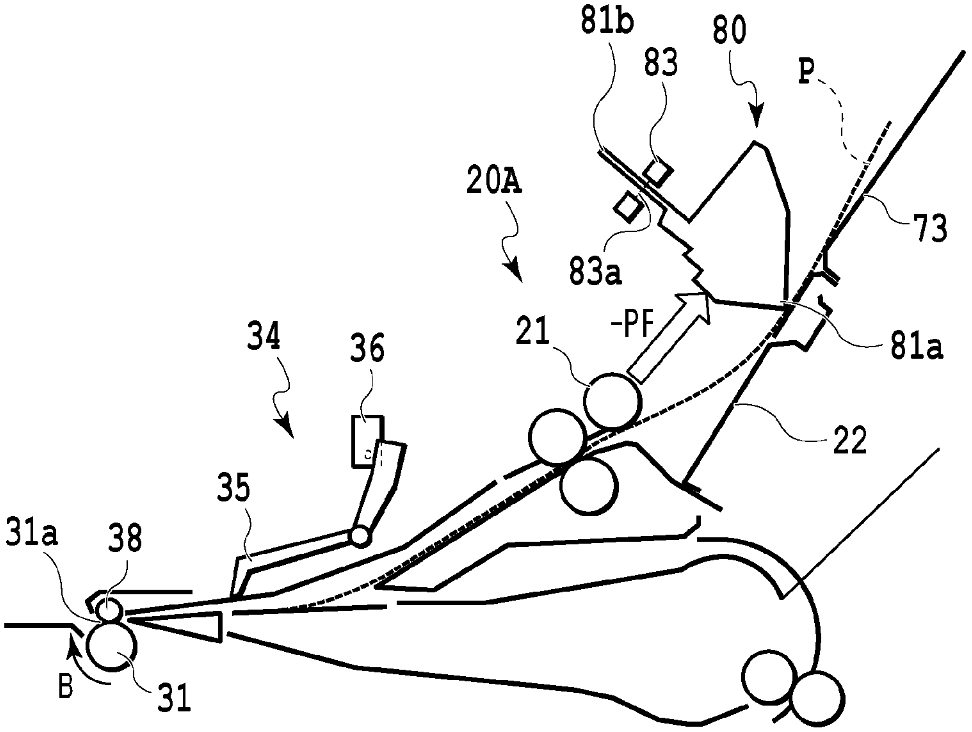
Figure 14A:
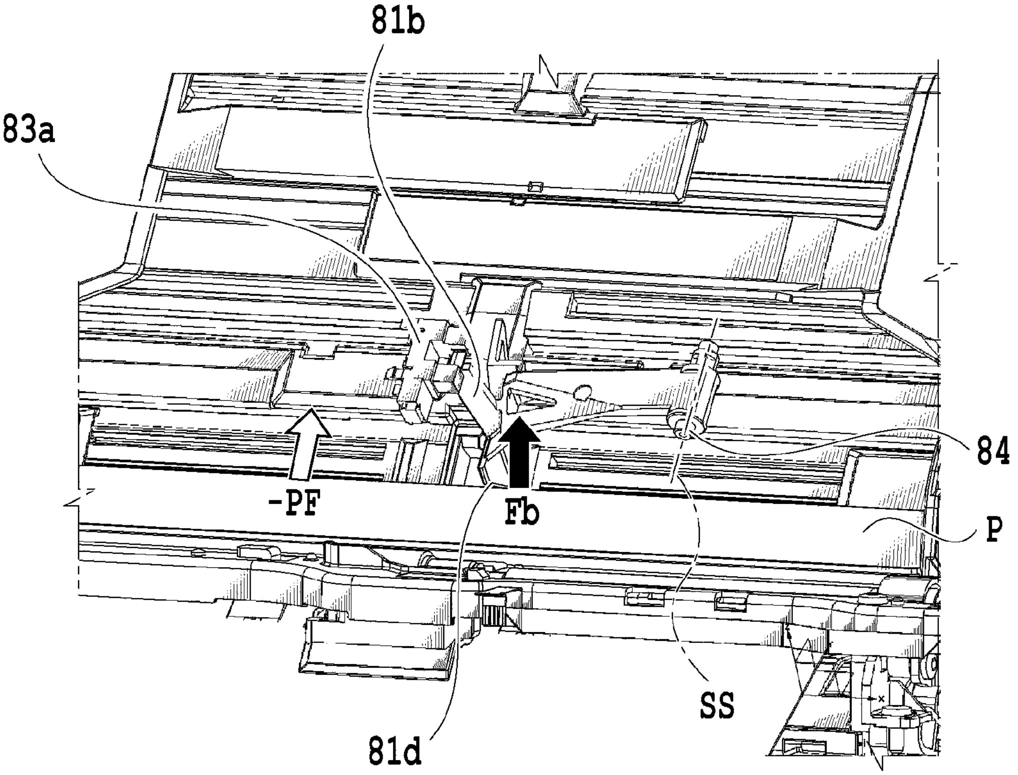
Figure 14B:
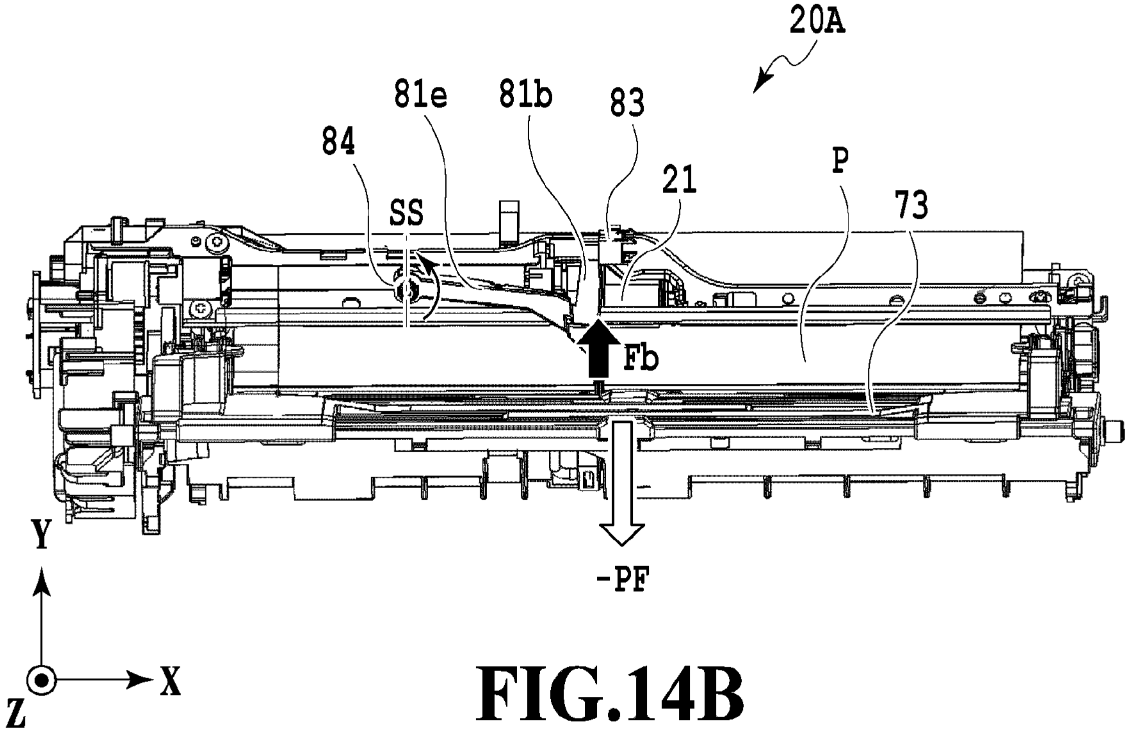

In a case where the conveyance roller 31 rotates reversely in the state shown in FIG. 13A and the printing medium P is conveyed in the −PF direction, the rear edge of the printing medium P enters the detection lever 81 from the downstream side. At this time, as shown in FIG. 14A, the rear edge of the printing medium P comes into contact with the downstream-side slope surface 81*d* of the detection lever 81. The position in the X-axis direction at which a force Fb is applied to the detection lever 81 is shifted from the position in the X-axis direction of the rotation axis 84, and therefore, as shown in FIG. 14B, the moment to the orientation to which the detection lever 81 is lifted up occurs. Due to this, the detection lever 81 rotates upward and after that, as shown in FIG. 13B, the tip 81*a* of the detection lever 81 lands on the surface of the printing medium P.

<Control Unit>

Figure 15:
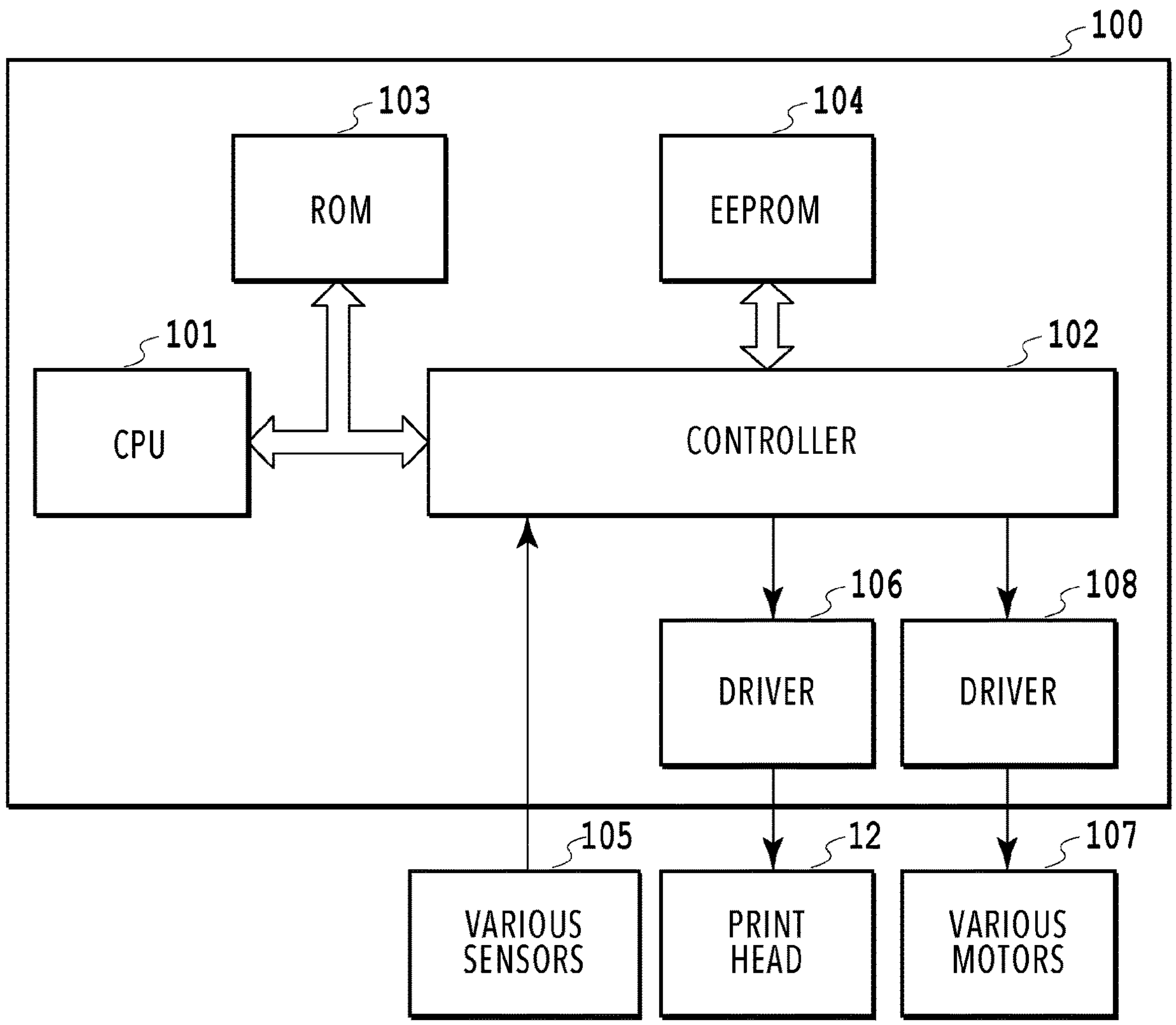
FIG. 15 is a block diagram of a control unit.

In the following, the configuration of the control system of the printing apparatus 1 is explained by using FIG. 15. FIG. 15 is a block diagram of the control unit 100 configured to control the printing apparatus 1. The control unit 100 is a control circuit that controls the operation of each function unit of the printing apparatus 1.

A CPU 101 controls the entire printing apparatus 1. A controller 102 assists the CPU 101 and in accordance with detection results of various sensors 105, controls the drive of various motors 107 and the print head 12.

In a ROM 103, various kinds of data, control programs of the CPU 101, and the like are stored and in an EEPROM 104, various kinds of data and the like are stored. It may also be possible to adopt another storage device in place of the ROM 103 and the EEPROM 104.

A driver 108 drives the various motors 107. The various motors 107 include, for example, a motor that is the driving source 25, a motor that is the driving source 32, a motor that is the driving source 13, and the like. A driver 106 drives the print head 12. The various sensors 105 include a sensor that detects the position of the carriage 11, a sensor that is arranged in a conveyance path of a printing medium and which detects the front/rear edges of the printing medium (specifically, front/rear edge detection unit 34), the detection unit 80 within the feeding unit 20A, and the like.

Effects of the Present Embodiment

According to the embodiment described previously, it is possible to provide a printing apparatus capable of rotating without a detection lever digging into a printing medium in a case where the printing medium is inserted in an insertion direction and the printing medium is pulled out in a return direction opposite to the insertion direction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is possible to provide a printing apparatus that is unlikely to damage a printing medium with a detection lever.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-215558, filed Dec. 24, 2020, which is hereby incorporated by reference herein in its entirety.

What is claimed is:

1. A printing apparatus comprising:

a loading table configured to be loaded with a printing medium inserted from an upstream side of the loading table along a conveyance direction, and to rotate about a first rotation axis along a width direction of the printing medium intersecting with the conveyance direction;

a feeding roller configured to convey the printing medium on the loading table in the conveyance direction;

a detection lever configured to rotate about a second rotation axis extending in the conveyance direction for detecting a printing medium on the loading table; and a tip portion provided on a leading side of the detection lever and configured to contact with the printing medium on the loading table just upstream of the first rotation axis with respect to the conveyance direction, wherein in the width direction, a first position of a contact between the tip portion and the printing medium and a second position of a center of the second rotation axis are different.

2. The printing apparatus according to claim 1, wherein the conveyance direction includes a first direction in which the printing medium is sent from an upstream side to a downstream side and a second direction opposite to the first direction.

3. The printing apparatus according to claim 2, wherein the tip portion has a first slope surface on an upstream side, which is a source side of conveyance of the printing medium, and in a case where the printing medium is placed on the loading table, a front edge of the printing medium comes into contact with the first slope surface.

4. The printing apparatus according to claim 3, wherein by contact between the front edge of the printing medium and the first slope surface, the detection lever rotates upward.

5. The printing apparatus according to claim 4, wherein an angle formed by the first slope surface and the vertical direction is an angle at which the detection lever is lifted up with a load less than or equal to a buckling load of the printing medium.

6. The printing apparatus according to claim 3, wherein the tip portion has a second slope surface on a downstream side, which is a destination of conveyance of the printing medium, and in a case where the printing medium is conveyed in the second direction, a rear edge of the printing medium comes into contact with the second slope surface.

7. The printing apparatus according to claim 6, wherein by contact between the rear edge of the printing medium and the second slope surface, the detection lever rotates upward.

8. The printing apparatus according to claim 7, wherein an angle formed by the second slope surface and the vertical direction is an angle at which the detection lever is lifted up with a load less than or equal to a buckling load of the printing medium.

9. The printing apparatus according to claim 1, wherein a tip of the tip portion in a case where the printing medium is not placed on the loading table lands on a position on the loading table lower than that of the tip in a case where the printing medium is placed on the loading table.

10. The printing apparatus according to claim 1, further comprising:

a conveyance unit configured to convey the printing medium;

a print head that prints an image on the printing medium;

a carriage on which the print head is mounted; and a driving source that generates a driving force causing the carriage to reciprocate along the width direction.

11. The printing apparatus according to claim 1, wherein the loading table rotates at the time of feeding the printing medium on the loading table by the feeding roller.

12. The printing apparatus according to claim 1, further comprising:

a tray on which the printing medium is placed and which is arranged on the upstream side of the loading table with respect to the conveyance direction, wherein the tray is openable relative to a main body of the printing apparatus.

13. The printing apparatus according to claim 2, further comprising:

a conveyance roller configured to convey the printing medium conveyed by the feeding roller, wherein a rear edge of the printing medium passes the first position by being conveyed in the second direction by the conveyance roller.

14. The printing apparatus according to claim 1, further comprising a lever flag provided on a top section of the tip portion, and a sensor configured to detect the lever flag.

* * * * *